Oct. 26, 1965
R. L. WRAY, JR
3,214,570
HEATING DEVICE CONTROL
Filed March 6, 1962
3 Sheets-Sheet 1
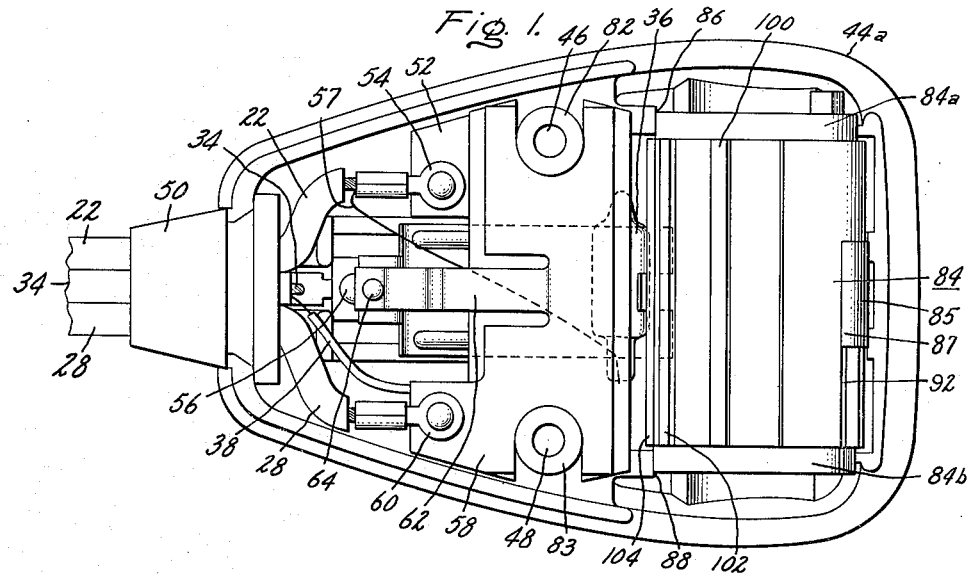
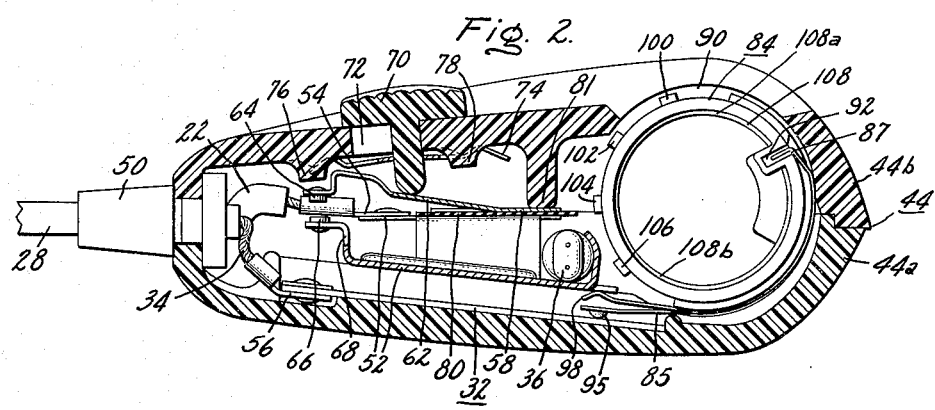
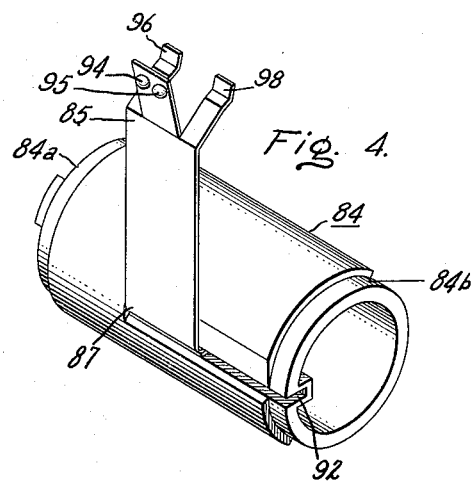
Inventor:
Robert L. Wray, Jr.
by Laurence R. Kempton
His Attorney.

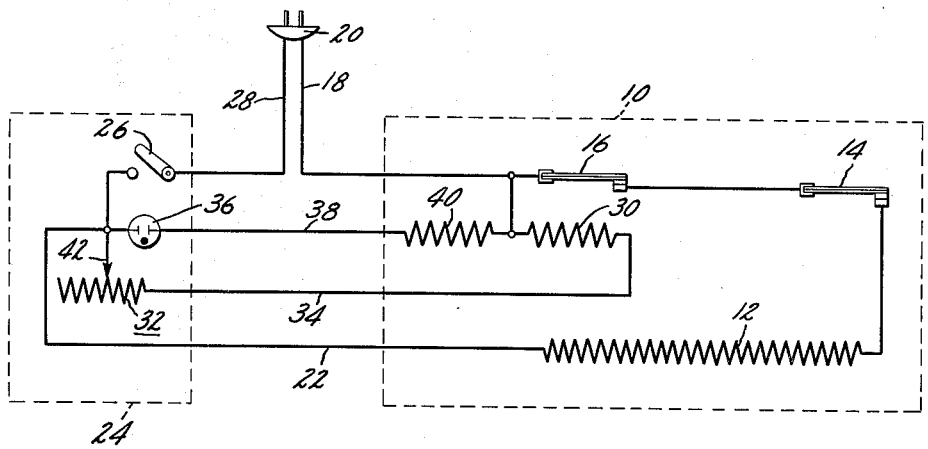

Oct. 26, 1965  R. L. WRAY, JR  3,214,570
HEATING DEVICE CONTROL
Filed March 6, 1962  3 Sheets-Sheet 3

Inventor:
Robert L. Wray, Jr.
by Lawrence R. Kampen
His Attorney.

United States Patent Office 3,214,570
Patented Oct. 26, 1965

3,214,570
HEATING DEVICE CONTROL
Robert L. Wray, Jr., Asheboro, N.C., assignor to General
Electric Company, a corporation of New York
Filed Mar. 6, 1962, Ser. No. 177,826
12 Claims. (Cl. 219—489)

This invention relates to improvements in circuits and controls for heating devices, such as heating pads and the like.

In various heating devices such as heating pads for example, it is customary to provide a control unit by which the device may be operated at any of various temperatures or predetermined heats. This is frequently accomplished by providing a biasing heater adjacent a control thermostat and varying the current to the biasing heater so as to vary the amount of heat supplied thereby to the thermostat. In this way the environmental temperature of the heating device may be varied since the shut-off point of the thermostat is controlled both by the temperature of the environment and the temperature of the biasing heater. For purposes of this application, environmental temperature may be considered to be the average surface temperature of the device or the average temperature of the environment immediately surrounding the device. The invention discloses several improvements for devices incorporating such an arrangement and more specifically discloses improvements to a remotely positioned control unit for controlling the operation of a heating pad.

It is a primary object of this invention to provide an improved heating device control unit in which the environmental temperature of the heating device varies substantially linearly with the manual equal incremental adjustment of a manual control means.

It is a further object of this invention to provide a heating device control unit having an infinitely adjustable manual control member and a colored heat indicator which indicates the heat setting of each position of said control member.

Yet another object of this invention is to provide a heating device control unit incorporating an inexpensive electrically tapered control resistor that may be infinitely varied to control the heat output of a heating pad.

Another object of this invention is to provide a heating device control unit with a manual control member for varying and setting the heat output of a heating pad with a separate on-off switch for controlling the operation of the pad.

Another object of this invention is to provide a heating device control unit in which the amount of heat dissipated in the unit is kept to a minimum.

It is another object of this invention to provide a uniquely arranged heating pad control unit which may be conveniently held and operated by one hand of the user of the pad.

It is a further object of the invention to provide an arrangement for reducing the number of cords forming the cord set connecting a heating pad and its remotely positioned control unit.

Briefly stated, one aspect of this invention relates to a heating pad or similar device having a heater circuit including a main heater and a control thermostatic switch, and a control circuit including a biasing heater positioned in heat transferring relation to the switch and a non-linear adjustable control resistor for varying the heat output of the biasing heater. A manually operated control means is connected to the control resistor for adjusting the non-linear resistor so that the temperature of the heating pad varies substantially linearly with movement of the control means. In other words, when the operator or user of the pad moves the control means a certain percentage of its allowable movement, say 50%, he will change the heat output of the pad by approximately 50% of its allowable temperature range. This provides a very realistic and satisfactory control for the pad which simplifies the controlling operation for the user.

As another aspect of the invention, the heating pad manual control means is made infinitely adjustable and may include an infinitely variable colored heat indicator which corresponds to the heat setting of the manual control means.

As yet another aspect of the invention, the heating pad is provided with an on-off switch which controls the operation of the pad independently of the manual temperature control setting.

In a heating pad, a control unit is usually positioned remote from the pad to be easily operated by the user and it is desirable to minimize the number of conductors forming the cord set connecting the pad to the control unit. As another aspect of the invention a single strand control circuit conductor is insulated and combined with a larger stranded conductor to reduce the number of separate lines in the cord set.

Further features, objects and advantages will become apparent with reference to the following drawings in which:

FIG. 1 is a plan view of the internal parts of the heating pad control unit of the invention;

FIG. 2 is a cross-sectional view of the control unit of FIG. 1;

FIG. 3 is a circuit diagram showing the heating pad and control unit of the invention;

FIG. 4 is a perspective view of the manually movable control means for the control unit of FIG. 1;

Figure 5:
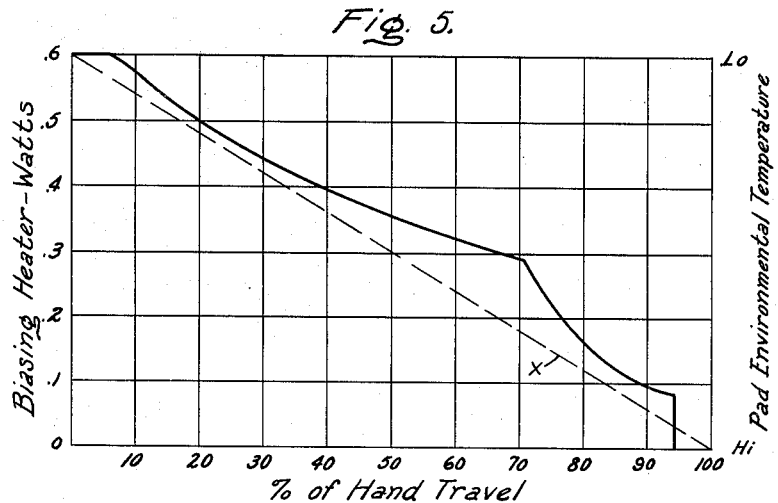
FIG. 5 is a graph illustrating the changes of the heat output of the biasing heater and the environmental temperature of the heating pad versus the percent of travel moved by the manual control means.

Since the invention was made in connection with an electric heating pad, it will for the sake of convenience be described as incorporated in a heating pad. However, it should be understood that certain aspects and features of the invention may be readily incorporated in similar electrical heating devices such as ambient temperature responsive controls for electric blankets.

The invention may be more easily understood by first referring to FIG. 3 to examine the circuit diagram of a heating pad incorporating the invention. The body of the heating pad, as represented by the dotted lines 10, includes a main heater 12 serially connected to a safety thermostatic switch 14 and a control thermostatic switch 16. The thermostats are shown as of the bimetallic type; however, similar heat responsive types may be employed. The thermostatic switch 16 is shown connected to one conductor 18 leading to outlet plug 20. The main heater 12 is connected to a conductor 22 which leads to a controller or control unit 24 indicated by the dotted outline at 24 and connects to an "on-off" switch 26, which in turn is connected by the other conductor 28 leading to outlet plug 20.

To control the operation of the main heating circuit, there is provided a control circuit connected in parallel to the main heating circuit. This control circuit includes a biasing heater 30 positioned in heat transferring relation to the thermostatic switch 16 and includes an adjustable control resistor 32 located in the controller 24. The control resistor 32 is serially connected to the biasing resistor or heater by conductor 34, between the pad 10 and the controller 24.

For indicating whether the heating pad is in the "on" position there is provided a second control circuit including an indicating lamp 36 positioned in the controller 24, and a high resistance ballast resistor 40 located in the pad 10 and serially connected to the lamp by conductor 38. The indicating lamp control circuit is also connected in parallel to the main heater circuit and the biasing heater circuit.

In accordance with one aspect of the invention, all branches of the parallel circuit shown in FIG. 3 are serially connected to the "on-off" switch 26. With this arrangement, it is not necessary to change the setting of control resistor 32 when the heating pad is shut off. This is in contrast with the usual arrangement wherein an "off" position is incorporated in the operation of a control resistor or temperature control means. Thus, with the arrangement shown, it is not necessary to reset the temperature setting desired every time the pad is placed into operation, if the same temperature previously used is desired. Also, with the on-off switch connected as shown, and with the thermostatic switches 14 and 16 controlling current flow through the main heater 12 only, the parallel control circuit incorporating the biasing heater 30 is energized at all times when the switch is closed. This means that the biasing heat produced by the control circuit is continuous when the switch is closed and does not cycle when either thermostat cycles, thus providing rapid control with less maximum or peak bias wattage.

In operation, when the switch 26 is closed, the lamp 36 lights and the main heater 12 begins to heat the pad 10. This condition continues until one of the thermostatic switches opens to interrupt the flow of current to the heater 12. The thermostatic switch 16 is normally set at a level considerably below that of thermostatic switch 14 in that switch 16 serves as a control thermostat and switch 14 is a safety device in the event that switch 16 should not function properly. The biasing heater 30 is positioned to heat the control thermostatic switch 16, and it will be appreciated that the greater the heat output of the biasing heater 30, the quicker the switch 16 will open and thus the lower the average surface temperature of the heating pad. Stated otherwise, the heat output of biasing heater 30 is inversely proportional to the heat of the pad. In order to control the heat output of the biasing heater 30, it is necessary to control the current flow through the heater. Since the voltage applied is normally constant, this is accomplished by varying the resistance of the control resistor 32. When the conductor 42 is moved to the righthand end of control resistor 32, as viewed in FIG. 3, no current flows through the resistor 32, and thus the maximum current flow passes through biasing heater 30. Therefore, heater 30 provides its maximum heat output causing switch 16 to open quickly so that the lowest pad temperature is obtained at this setting. The highest pad temperature is obtained by moving conductor 42 to the lefthand end of the control resistor 32 and completely off the resistor giving zero current in the heater, and thus the heat output of biasing heater 30 is at its lowest level.

Thus, it will be appreciated that the lowest possible pad temperature depends upon the resistance value chosen for the bias heater 30 and the highest possible temperature depends upon the calibration of the control thermostatic switch 16. The heating pad temperatures between the high and low positions are determined by the value of the control resistor 32 and the value of the bias resistor 30. Since the value of the bias resistor 30 is fixed, the degree of "in-between" pad heat is controlled by the resistance of the variable control resistor 32. The resistance of the control resistor 32 may be variable to a certain limited number of settings or infinitely variable between its upper and lower limits. With the infinite arrangement shown, the value of the control resistor 32 can be varied in infinitely small amounts; and therefore, the pad heat may be varied in infinitely small amounts.

Further features and advantages of the circuit shown in FIG. 3 will be described in connection with a physical description of some of the components included in the circuit.

One form of the controller 24 may be seen in FIG. 2 as including an outer casing 44, which is preferably made of a material which is a good electrical insulator and a good heat insulator, such as plastic or the like. The casing may be formed in two half sections 44a and 44b that may be held together by two screws or other suitable fastening means which may be placed through the apertures 46 and 48, seen in FIG. 1. One end of the casing 44 is provided with an opening adapted to receive a flexible grommet 50 made of rubber, plastic or similar material, through which is introduced the conducting cord set including two stranded conductors connecting the controller 24 to the pad 10 and a third stranded conductor leading to the outlet plug 20. More specifically, stranded conductor 22 leading from the main heater 12 in the pad 10 shown in FIG. 3, is connected to contact plate 52 at terminal 54. Stranded conductor 34 is shown connected to one end of control resistor 32 at terminal 56. Control resistor 32, which is shown positioned along the bottom of the lower casing half 44a, will be subsequently described in greater detail. Stranded conductor 28 leading from the outlet plug 20 is connected within the controller to support plate 58 as shown at terminal 60.

It is desirable to keep the number of cords forming the cord set extending between the controller 24 and the heating pad 10 to a minimum. In accordance with one aspect of the invention, one cord has been eliminated for the lamp circuit by employing a single strand insulated conductor 38 for connecting the lamp to ballast resistor 40 and including it within the cord including stranded conductor 34. Thus, conductor 38 in effect becomes a tracer wire within the larger stranded conductor 34. As may be seen from FIG. 1, conductor 38 is connected to one terminal of glow lamp 36 which is supported by contact plate 52. The other terminal of glow lamp 36 is, in turn, connected to contact plate 52 at terminal 54 by conductor 57.

The "on-off" switch shown schematically at 26 in FIG. 3 is shown in FIGS. 1 and 2 as including a flexible contact arm 62 integral with the support plate 58 and having a contact 64 mounted on its free end. Contact 64 cooperates with contact 66 positioned on an upwardly extending tongue 68 which is formed integral with support plate 52. The switch is actuated by a manually operated "on-off" button 70, which is mounted within a hole 72 in the upper casing half 44b, as seen in FIG. 2. The button 70 has an external surface which may be engaged by the hand of the pad user when operating the switch and a depending portion which extends through the hole 72 and engages the flexible contact arm 62. The depending portion of the button also extends through a resilient guide plate 74, and the two parts are secured together by interference or "snap-fit" to move as a unit. The guide plate is formed with a pair of slots adapted to cooperate with the depending lugs 76 and 78 on the casing half 44b, which guide the sliding movement of the guide plate 74 and the switch button 70 to the left or the right, as viewed in FIG. 1, into the "on" or the "off" positions. As shown in FIG. 2, the control button 70 is in its extreme righthand position wherein the contact 64 on the end of arm 62 is not engaged with contact 66 so that the controller is in the "off" position. When moved to the extreme lefthand position, the depending portion of the control button 70 depresses the flexible contact arm 62 so that contact 64 engages contact 66, which is, of course, the "on" position.

The contact plates 52 and 58, which may be stamped from suitable conducting material, are separated by an insulating sheet 80, as seen in FIG. 2. The contact plates and the insulating sheet are held in position between the casing by having portions frictionally engaging the cylindrical bosses 82 and 83, FIG. 1, surrounding the openings 46 and 48, respectively. They are further positioned by ridge 81 depending from the upper casing half 44b.

To adjust the heat output of the biasing heater 30, and thus the heat output of the pad 10, it is necessary that a sliding contact arrangement be provided to complete the circuit through the control resistor 32. It is desirable that the sliding contact be connected to a manual control member which may be easily actuated to control the operating temperature. For this purpose, there has, in accordance with one aspect of the invention, been provided a uniquely arranged rotatable control member 84 and a sliding flexible contact arm 85. The control member 84 has been given a substantially cylindrical or tubular shape and is formed with suitable bearing surfaces 84a and 84b on the respective ends of the control member. These bearing surfaces engage suitable mating bearing surfaces 86 and 88 formed within each half of the casing 44. The upper half of the casing 44b has formed therein a window 90 so that the exterior surface of the control member 84 is accessible from outside the casing 44. The flexible contact arm 85 has one end 87 secured by any suitable means in a slot 92 formed in the periphery of the control member 84, as can be clearly seen in FIGS. 2 and 4. The contact arm 85 is made of suitable conducting material and has four offset contacts 94, 95, 96 and 98 on its opposite end. These contacts form a sliding contact element with contacts 94 and 95 engaging the surface of control resistor 32 and contacts 96 and 98 engaging the lower surface of contact plate 52, as may be clearly seen from FIG. 2. The contacts 96 and 98 and contacts 94 and 95 must be pressed toward each other to be inserted between contact plate 52 and resistor 32, and hence the resiliency of the material produces good electrical contact. It will be readily apparent that sliding the contacts 94, 95, 96 and 98 along the surface of control resistor 32 and contact plate 52 will vary the effective resistance of the control resistor 32.

In summary, the current flow through the control unit 24 is as follows: for the main heater circuit, through conductor 22 from main heater 12 to terminal 54 of contact plate 52, through switch contacts 66 and 64 to terminal 60 of contact plate 58 to conductor 28 and outlet plug 20; for the biasing control circuit, through conductor 34 from bias heater 30 to terminal 56 of control resistor 32, through the contacts of contact arm 85 to contact plate 52, switch contacts 66 and 64, terminal 60 of contact plate 58 and conductor 28 to plug 20; and for the lamp circuit, from tracer wire 38 connecting ballast resistor 40 to lamp 36, terminal 54 of contact plate 52, switch contacts 66 and 64, contact plate 58, terminal 60, conductor 28 to plug 20.

To facilitate manual movement, the exterior surface of the control member 84 has been provided with a plurality of ribs 100, 102, 104 and 106 which extend in a direction parallel to the rotational axis of the cylindrical control member 84. As the control member 84 is rotated in a counterclockwise direction, as viewed in FIG. 2, the flexible arm 85 is wrapped around the outer surface of the control member. Conversely, when rotated in a clockwise direction, the flexible arm 85 is unwrapped from the control member. When the flexible arm 85 is unrestrained, it extends tangentially from the cylindrical control member 84 as may be seen in FIG. 4. Conversely, when the flexible arm is wrapped around the control member 84, the contact arm is placed into a restrained position and it reacts against the casing surface surrounding the control member 84. This force provides a certain resistance to rotation of the control member 84 so that slippage is prevented and rotation of the control member requires a positive force. It should be understood however, that this positive force may be easily provided by the user of the heating pad by pressing his finger or thumb tangentially against the outer surface of the control member 84.

It should be pointed out that the control unit 24 may be formed in a very small and compact unit which can be easily held in one hand. Further, by positioning the manually operated heat setting control member 84 and the manual control button 70 of the on-off switch on one side of the casing 44, as seen in FIG 2., both may be easily operated with the thumb of the hand holding the control unit.

In accordance with one aspect of this invention, the cylindrical control member 84 may be made of a clear or transparent material which is also a good electrical and heat insulator. One material possessing these properties which has been found suitable is clear, flame-retardant cellulose acetate. Within the control member there is placed a piece of paper 108 or similar material such as plastic film which has a colored surface visible through the control member to form a colored indicator of the heat level. The paper may be colored as desired but is preferably given a gradually changing color which will provide an infinitely changing indicator. For example, the end 108a of the paper 108 which is visible through the window 90 when the control member 84 is positioned as shown in FIG. 2 may be colored a fiery red to indicate a high heat level, and the portion 108b of the paper may be colored yellow to indicate a low heat level. Between these two extremes, the color of the indicator may be gradually changing from the bright red to the yellow. The advantage of the colored indicator is, of course, that people tend to associate various colors as being hotter or warmer than others. Thus, the control operator may easily see at a glance which direction the control member 84 should be rotated in order to increase or decrease the heat level. To avoid any possible confusion, the word "HIGH" may also be printed on the indicator paper at the high end of the heat range and the word "LOW" may be printed on the opposite end. If desired, the paper 108, control member 85 or the surrounding casing may also be provided with additional markings, perforations, numerals or letters to indicate the heat level. The lamp 36, of course, illuminates the control member and its indicator paper 108 by refraction and reflection so that the colored indicator arrangement is particularly graphic when the control is used in a dark room, as is frequently the case.

When operating the control member 84, it is desirable that the rotation of the control member linearly corresponds with the change of the heat output of the bias heater 30 and thus the heat output of the heating pad 10. Or in other words, it is desirable that equal increments of rotation of the knob 84 produce approximately equal changes in the heat output of the pad 10 regardless of the position of the sliding contacts along the surface of the control resistor 32. The wattage or heat output of the biasing heater 30 is, of course, determined by the resistance of the heater and the current flow through the heater. Since the resistance of biasing heater 30 is constant, the current is the only variable and it may be varied by adjusting the resistance of the serially connected control resistor 32. In the arrangement shown, the control resistor 32 employed is a simple film strip resistor which is formed by coating a base of textolite or similar material having an infinitely large resistance with material having an electrical resistance of the desired value. If the resistance values of the coated strip resistor 32 change linearly along the length of the strip resistor, the relationship between the movement of the control member 82 and the resulting surface pad temperature will not be linear in that the current flow changes linearly as the resistance changes in a series connection while the wattage or heat dissipation of the biasing heater 30 varies as the square of the current passing through the heater. Consequently, there is provided, in accordance with the invention, an electrically tapered resistor which will substantially provide the desired linear relationship between the hand travel of the operator and the pad temperature.

The relationship between the hand travel of the operator and the pad temperature may be seen by reference to the graph of FIG. 5. The abscissas on the graph represent the percent of travel moved by the user's thumb or hand while operating the manual control member 84. They may also be thought of as representing the percent of rotational movement of the control member 84, or as the percent of movement of the sliding contacts 94, 95, 96, and 98 along the surface of the electrically tapered control resistor 32 and the fixed contact plate 52. The ordinates of the graph represent the heat dissipation or output of wattage of the biasing heater 30, as shown on the left hand scale. The ordinates also represent pad environmental temperature as shown on the right hand scale.

If the control resistor 32 is electrically tapered to produce a perfectly straight line on the graph of FIG. 5, the line would extend from maximum wattage, which is shown as .6 on the graph, at zero percent travel to zero wattage at 100% travel, as represented by the broken line on the graph. The zero percent travel, of course, refers to the lowest heat setting for the control member 84 wherein the heat output of biasing heater 30 is at a maximum and the pad environmental temperature is at its lowest, and 100% travel refers to the highest heat setting for the control member 84 wherein the biasing heater 30 has no heat output and the pad environmental temperature is at its highest. For economy reasons the actual control resistor employed to obtain the solid line on the graph is electrically tapered only enough to make a substantially straight line relationship. This resistor will be hereinafter described is greater detail.

Since the control resistor 32 is located in control unit 24, it is desirable that the heat output of the control resistor be kept to a minimum. In the series arrangement shown, the maximum power dissipated by the biasing heater 30 is four times greater than the maximum power dissipated by the control resistor 32. This may be explained mathematically:

$$W_T = W_1 + W_2 = \frac{E^2}{R_1 + R_2}$$

where $W_T$ is the total wattage of the series control circuit including $R_1$ which is bias heater 30, and $R_2$ which is control resistor 32, $W_1$ is the wattage dissipated by $R_1$, $W_2$ is the wattage dissipated by $R_2$, and E is the constant supply voltage across $R_1$ and $R_2$ combined. When $R_2$ is zero, the wattage is entirely attributed to $R_1$ so $$W_T \text{ (max.)} = W_1 \text{ (max.)} = \frac{E^2}{R_1}$$

and both $W_T$ and $W_1$ are at a maximum. When $R_2$ is equal to $R_1$, $$W_T = \frac{E^2}{2R_1}$$

or in other words, the wattage output is only ½ what it is when $R_2$ is zero. Since $R_1 = R_2$, $W_T$ is split between $R_1$ and $R_2$; thus $$W_1 = W_2 = \frac{E^2}{4R_1} \text{ or } \frac{1}{4}W_1 \text{ (max.) or } \frac{1}{4}W_T \text{ (max.)}$$

It will be appreciated that increasing or decreasing $R_2$ from the value of $R_1$ results in a decrease in $W_2$. Thus, $W_1$ at maximum equals four times $W_2$ at maximum.

The four to one relationship also helps to determine the manner in which the control resistor 32 should be electrically tapered to obtain the desired linear relationship between hand travel and pad heat output. As the heat output of the biasing heater 30 decreases from maximum to ¼ maximum, the manual control means 84 should move 75% or ¾ of its total travel to obtain the desired linear relationship. Thus, in view of the previous paragraph, the resistance of heater 30 should equal the resistance of resistor 32 at the 75% point. At this point, indicated by an "X" on the broken line of the graph in FIG. 5, it may be seen that the wattage output is .15 or ¼ of .6 or maximum.

Figure 6:
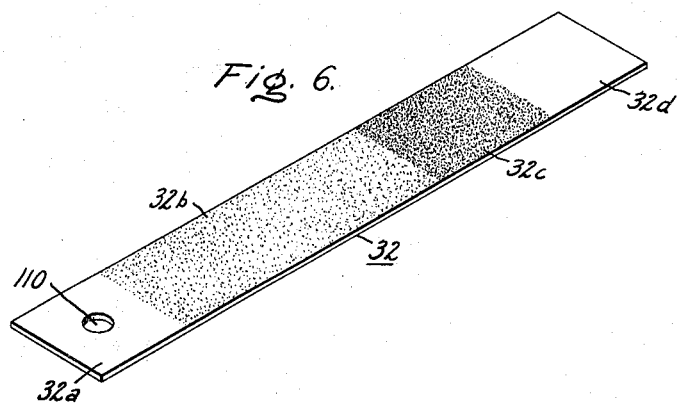
FIG. 6 is a perspective view of an adjustable control resistor which is employed in the heating pad control unit of the invention.

Although it might be desirable to employ a film strip resistor which has a uniform electrically tapered resistance, that is, which would produce a completely linear relationship with respect to hand travel of the control member, the manufacturing cost of such a resistor is presently prohibitive. An inexpensive alternative which furnishes substantially the linear relation desired is shown in FIG. 6. One end 32a of the resistor 32 is provided with an aperture 110 by which the resistor may be connected to stranded conductor 34 at terminal 56 as seen in FIG. 2. This end section 32a of the resistor is coated with a conducting material to provide good contact with the conductor 34. Immediately adjacent the section 32a there is provided a section 32b having a relatively low resistance value. Following this there is section 32c having a high resistance coating. The end section 32d is uncoated and thus has effectively an infinite resistance in that the film strip material employed is an extremely poor conductor.

Employing a resistor of the type shown in FIG. 6 in the heating pad control of the invention has produced the relationship between movement of the user's hand or the rotation of the control member 82 and the heat output of the biasing heater 30 shown by the solid line in the graph of FIG. 5. The soild line also represents the relationship between movement of the user's hand and the pad enviornmental temperature. As an aid to understanding this aspect of the invention, a specific example of the values of the resistances employed to obtain the wattage output indicated by the solid line in the graph will be given. For purposes of illustration, assume the resistance of main heating element 12 to be approximately 230 ohms, biasing heater 30 to be 22,000 ohms, section 32b of control resistor 32 to be approximately 10,000 ohms and section 32c approximately 27,000 ohms for a total 37,000 ohms in the control resistor.

At zero percent of travel, the contacts of the sliding contact 85 are positioned to the extreme left as viewed in FIG. 2, so that contact 94 engages section 32a of the control resistor 32 wherein the control resistor presents effectively no resistance to the current flow. With the heating pad connected to a 115 volt source, and with the assumed resistance values given, the biasing heater will produce approximately .6 watt in this position which is the highest heat output level of the heater 30, as indicated by the left hand vertical scale in the graph of FIG. 5, and the lowest heat setting for the entire heating pad, as indicated by the right hand vertical scale. Since the user of a heating pad expects a pad temperature of at least several degrees above skin temperature even when the pad is set for its lowest heat setting, the heating pad is arranged to perform in such fashion. To compensate for this irregularity in gradual heat increase, the control unit of the invention has been arranged so that the sliding contacts 94 and 95 remain engaged with section 32a of control resistor 32 for approximately 6% of the hand travel, as may be seen in FIG. 5.

With continued movement of the control member 84 towards its highest heat setting, the sliding contacts 94 and 95 engage section 32b of the control resistor causing a reduced heat output from the biasing heater 30 and a higher pad temperature. As can be seen from the graph, the heating power of the biasing heater 30 has a substantially straight line or linear relationship with the percent of travel of control member 84 during the major portion of the travel while the sliding contact is engaged with section 32b of the control resistor. However, it can be seen that as the sliding contact moves toward the end of section 32b wherein it has moved approximately 50% to 60% of travel that the line of the graph is beginning to curve somewhat. At approximately 70% of the travel position, the sliding contact engages sections 32c of the control resistor 32 causing a rapid increase in resistance and thus a decrease in the current flow through the biasing heater 30 and a corresponding decrease in the power output of the bias heater and increase in the pad temperature. As can be seen from the graph, the increased resistance of the section 32c changes the slope of the graph somewhat so that the net result is a substantially linear relation between the percent travel and the biasing heater output, and ultimately the heating pad temperature.

It should be noted, that with the resistance values given, the point at which the resistance for the control resistor 32 equals the resistance of the biasing heater is in the area of 80% of hand travel rather than 75%, as previously mentioned in connection with the discussion of the theoretical broken line graph. This variation emphasizes the advantage of the serially connected control circuit arrangement of the invention in that a substantially linear relationship may be obtained over a relatively wide tolerance range. Since the exact point at which the resistances of the two resistors are equal is not extremely critical in order to obtain relatively accurate linear control, manufacturing costs for the strip resistors 32 may be kept to a minimum.

At approximately the 94% of travel point, it can be seen that the power output of the biasing heater drops to zero due to the fact that the sliding contacts 94 and 95 at this point contact section 32d on the control resistor 32, which section has an infinitely large resistance so that current flow through the control circuit is effectively zero and pad temperature is at its highest setting. Consequently, the relationship between the pad temperature and the last 6% of travel on the manual control member 84 is not linear. In order to obtain a completely linear relationship, the strip resistor 32 would have to gradually taper to an infinitely large resistance. Alternatively, one or more additional resistance sections could be added between section 32c and 32d to obtain a greater degree of accuracy. However, it can be seen that at the 94% of travel point the biasing heater output is approximately .08 watt, which is only approximately 13% of the total biasing heat involved. Consequently, no major change in pad temperature is noted when the sliding contacts 94 and 95 move from section 32c to the infinite resistance of section 32d, so that the savings in manufacturing costs by employing a simpler control resistor seem justified. Thus, the control resistor need span a range of only about 1.6 times the value of the biasing heater to achieve an 87% decrease from maximum of the heat output of biasing heater 30.

With the arrangement shown, it should be appreciated that accurate proportioning of the biasing power is obtained with a relatively small resistance span in the control resistor so that wide tolerances are permitted to obtain low manufacturing costs. In this connection, it should be noted that the series arrangement shown has the additional benefit of requiring only low current values thus employing resistors of high value. Again, of course, this means wide manufacturing tolerances and wide availability of commercial components with suitable values. Further, conductor 34, connecting resistors 30 and 32 may be relatively small resulting in a smaller cord set.

Figure 7:
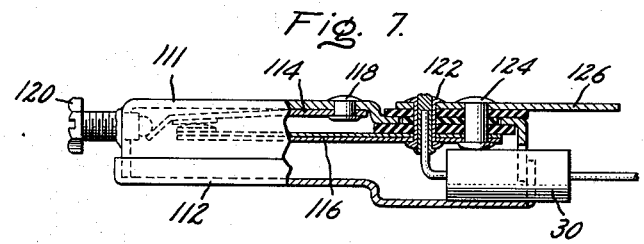
FIG. 7 is a side elevation, partially in section, of a control thermostat and biasing heater therefor, incorporated in the heating pad of the invention.

In order for the heat output of the biasing heater 30 to directly and accurately affect the operation of control thermostatic switch 16, it is necessary that the biasing heater 30 be positioned in close heat transfer relationship to the control switch. A unique assembly for accomplishing this function is shown in FIG. 7, as including a casing 111, a cover 112, an adjustable flexible contact arm 114 secured to the casing 111, and a bimetallic contact arm 116. The contact arm 114 has one end fixed to the casing 111 by suitable fastening means such as rivet 118, and the bimetallic contact arm 116 is secured to the casing 111 in insulated relation to the casing by means of a pair of rivets 122 and 124, or suitable means. These rivets also support terminal plate 126 which is adapted to be connected to one conductor of the power line, such as conductor 18, as shown in FIG. 3. Rivet 122 is formed with a hollow center through which is inserted and soldered a connecting wire leading to biasing heater resistor 30. The opposite end of resistor 30 is connected to stranded conductor 34 leading to control resistor 32. Thus, it can be seen that plate 126 constitutes a common terminal for the assembly, being electrically connected to the bimetallic contact arm 116 and the biasing resistor 30. The casing 111 being in contact with the flexible contact arm 114 constitutes the other terminal of the assembly. The current will flow through the thermostatic switch whenever the contacts on the arms 114 and 116 are engaged, and biasing resistor 30 is connected to receive current from the line through the contact plate 126 at all times. Since the biasing resistor 30 is in such close proximity to the bimetallic arm 116, the heat given off by the biasing resistor is quickly absorbed by the bimetallic arm so that changes in the amount of heat output quickly affect the operation of the thermostatic switch.

The switch is adjustable by means of adjusting screw 120, engaging the free end of contact arm 114; however, such adjustment is normally not made by the user of the heating pad in that the switch is positioned within the pad. Instead the adjustment is normally made at the time of original assembly or subsequent repair.

While a specific embodiment of the invention has been shown and described, it should be understood that the invention is not limited to the particular construction described. For example, the broad idea of using an electrically tapered control resistor is not limited to the flat strip shaped resistor shown herein but includes other shapes as well. Accordingly, it is intended in the appended claims to cover all modifications within the spirit and scope of the invention.

What I claim is:

1. In a heating device, a main heater, a control thermostatic switch in series with said main heater, a resistance biasing heater positioned in heat transfer relation with said thermostatic switch, a variable control resistor in series with said biasing heater having a resistance equal to said biasing heater resistance at one point of its adjustment, and manual means to adjust said control resistor from effectively zero resistance to said one point over approximately three-quarters of the full range of said manual adjustment.

2. In an electric heating device, a main heater, a thermostatic switch serially connected to said heater, a biasing heater positioned in heat transfer relation with said thermostatic switch, a control resistor having a non-linear resistance along its length for varying the heat output of said biasing heater, a manual control member for infinitely adjusting the resistance of said control resistor so that the environmental temperature of said heating device varies substantially linearly with linear adjustment of said manual control member, and an infinitely variable colored indicator on said manual control corresponding to infinite adjustment of said control resistor and resulting heating surface temperature of said pad.

3. In a heating device, a heating pad; a controller remote from the pad for controlling the operation of the pad; two stranded power conductors interconnecting said controller and said pad; a power circuit including a main heater in said pad, at least one thermostatic switch in said pad, and an on-off switch in said controller; a first control circuit including a bias heater positioned in said pad in heat transferring relation to said thermostat; and an adjustable control resistor located in said controller for controlling the heat output of said bias heater; a second control circuit including an indicator lamp in said controller, and a ballast resistor for said indicator lamp in said pad; and at least one of said control circuits being interconnected between the controller and pad by an insulated strand incorporated into one of said power conductors.

4. In a heating device, a main heater, a thermostatic switch in series with said heater, a biasing heater positioned in heat transferring relation to said thermostatic switch, a control resistor in series with said biasing heater, said biasing heater and said control resistor being connected in parallel with said main heater and said switch, manual means for adjusting said control resistor to vary the heat output of said biasing heater, said control resistor being electrically tapered from zero resistance at one end to effectively infinite resistance at its opposite end in such manner that the temperature of the environment heated by said heating device varies substantially linearly with equal incremental adjustments of said manual means.

5. In a heating device, a main heater, a thermostatic switch connected in series with said main heater, a biasing heater positioned in heat transferring relation to said thermostatic switch, a control resistor serially connected to said biasing heater to vary the heat output of said biasing heater, and manual means for adjusting said control resistor, said control resistor comprising a base of insulating material having a plurality of coated sections consecutively positioned along said base, each of said coated sections having an electrical resistance per unit of length which is different from the adjacent sections, said sections being arranged so that in adjusting said control resistor the heat output of said biasing heater and thus the temperature of the heating device surface varies substantially linearly with equal incremental adjustments of said manual means.

6. In a heating device, a heating pad comprising a main heater, a thermostatic switch, and a biasing heater positioned in heat transfer relation to said thermostatic switch; a controller remotely positioned from said pad but electrically connected to the pad; said controller including a strip control resistor for varying the heat output of said biasing heater, a fixed contact positioned substantially parallel to said control resistor and spaced from said resistor, a rotatably mounted manually movable control member, a flexible contact arm having a contact end simultaneously engaged with said control resistor and said fixed contact and an opposite end attached to said control member so that manual rotation of said control member slides the contact end along said control resistor and said fixed contact to vary the heat output of said biasing heater.

7. In a heating device, a heating pad comprising a main heater, a thermostatic switch, a biasing heater positioned in heat transfer relation to said thermostatic switch; a controller electrically connected to said pad; said controller including a casing, a control resistor positioned within said casing and serially connected to said biasing heater, a manual means rotatably mounted within said casing and adapted to adjust the effective resistance of said control resistor and thus the heat output of said biasing heater, said manual means having an exterior surface which is accessible from the exterior of said casing, said controller being sufficiently compact to be easily held in the hand of the person operating the controller, said manual means being easily rotated by engaging said surface with the thumb of the hand holding said controller, and a sliding on-off switch for controlling said heating pad independently of said manual means, said on-off switch being mounted on said casing adjacent said manual means and also being adapted to be easily moved by the thumb of the hand holding said controller.

8. A control unit for an electric heating device comprising an electrically insulated casing having a plurality of walls, an adjustable control resistor mounted within said casing for controlling the heat output of the heating device, and manual means for adjusting the resistance of said control resistor, said manual means including a cylindrically shaped control member mounted within said casing adjacent a window in one wall of the casing so that a portion of the exterior cylindrical surface of the control member is accessible through the window of the casing, said control member being mounted to be manually rotated about its cylindrical axis by applying a force to the accessible surface of said control member in a direction tangential to the axis of said control member.

9. The control unit of claim 8 including a colored indicator positioned within said cylindrical control member in a manner to be visible from the exterior of said casing through said window for indicating the heat setting of said control unit.

10. The control unit of claim 9 including a light source positioned within said casing to illuminate said colored indicator.

11. In an electric heating device, a main heater, a thermostatic switch in series with said heater, a biasing heater positioned in heat transfer relation to said thermostatic switch, a variable control resistor in series with said biasing heater, said biasing heater and said control resistor being connected in parallel with said main heater and said switch, manual means for adjusting said control resistor to vary the heat output of said biasing heater, said control resistor being electrically tapered from a low resistance at one end to a high resistance at its opposite end in such a manner that the temperature of the environment heated by said heating device varies substantially linearly with linear adjustment of said manual means.

12. The device of claim 11 including a separate manually operated "on-off" switch serially connected with said main heater and serially connected with the combination of said biasing heater and said control resistor whereby the device may be de-energized without disturbing the setting of said control resistor.

References Cited by the Examiner
UNITED STATES PATENTS

| | | | |
|---|---|---|---|
| 2,024,153 | 12/35 | Eskin | 219—494 |
| 2,425,686 | 8/47 | Porter | 219—486 |
| 2,513,415 | 7/50 | Larsen et al. | 338—69 |
| 2,613,630 | 10/52 | McNairy | 116—139 |
| 2,625,633 | 1/53 | Warsher | 338—122 |
| 2,705,276 | 3/55 | Wise | 219—488 |
| 2,772,338 | 11/56 | Crowley | 219—504 |
| 2,975,389 | 3/61 | Karg | 338—176 |
| 2,999,993 | 9/61 | Sherwood | 338—176 |
| 3,008,111 | 11/61 | Julie | 338—122 |

RICHARD M. WOOD, *Primary Examiner.*